United States Patent
Alanazi et al.

(10) Patent No.: US 11,452,966 B2
(45) Date of Patent: Sep. 27, 2022

(54) INDUSTRIAL AIR CLEANER

(71) Applicant: Saudi Arabian Oil Company, Dhahran (SA)

(72) Inventors: Tariq Daifallah Alanazi, Dhahran (SA); Majed Tarek Almudarres, Dhahran (SA); Omran Hussain Falath, Damman (SA); Ali Said Alzahrani, Dhahran (SA)

(73) Assignee: SAUDI ARABIAN OIL COMPANY

( * ) Notice: Subject to any disclaimer, the term of this patent is extended or adjusted under 35 U.S.C. 154(b) by 149 days.

(21) Appl. No.: 17/105,176

(22) Filed: Nov. 25, 2020

(65) Prior Publication Data

US 2022/0161180 A1 May 26, 2022

(51) Int. Cl.
*B01D 47/06* (2006.01)
*B01D 53/75* (2006.01)
*B01D 53/78* (2006.01)

(52) U.S. Cl.
CPC ............. *B01D 47/06* (2013.01); *B01D 53/75* (2013.01); *B01D 53/78* (2013.01); *B01D 2257/304* (2013.01); *B01D 2257/404* (2013.01); *B01D 2257/502* (2013.01)

(58) Field of Classification Search
CPC ........ B01D 47/06; B01D 53/75; B01D 53/78; E04H 12/28; F05D 2220/75; F23J 13/00; F23J 15/02; F23J 15/025; F23J 2213/00; F23J 2215/00; F23J 2900/13004
See application file for complete search history.

(56) References Cited

U.S. PATENT DOCUMENTS

| 3,162,236 A | 12/1964 | Williams |
| 3,487,620 A | 1/1970 | Klein |
| 5,298,043 A | 3/1994 | Mai et al. |

(Continued)

FOREIGN PATENT DOCUMENTS

| AU | 2020 102 207 A4 * | 10/2020 | ............. B01D 53/79 |
| CN | 203829839 U | 9/2014 | |

(Continued)

OTHER PUBLICATIONS

PCT/US2022/060675 International Search Report and Written Opinion dated Feb. 23, 2022, 15 pgs.

(Continued)

*Primary Examiner* — Timothy C Vanoy
(74) *Attorney, Agent, or Firm* — Bracewell LLP; Constance Ghall Rhebergen

(57) ABSTRACT

Systems and methods for controlling emissions from industrial sources are provided. The system includes an industrial air treatment device that captures emissions from a stack, such as an industrial flare. The industrial air treatment device does not fully encompass or enclose the stack, but allows for ambient air flow with the emissions flow. The industrial air treatment device is separate from and not incorporated into the stack. The industrial air treatment device contains fans to draw in the emissions and air flow, and filters to treat the air flow. At least one of the filters can include a water dispersal system that captures and removes pollutants. The filters can include activated carbon, demister pads, and catalytic converters. The industrial air treatment device releases the treated air to the atmosphere.

21 Claims, 3 Drawing Sheets

(56) References Cited

U.S. PATENT DOCUMENTS

| | | |
|---|---|---|
| 6,451,096 B1 | 9/2002 | Kim |
| 6,652,243 B2 | 11/2003 | Kwack |
| 9,568,192 B1 * | 2/2017 | Archer ............... F23J 15/02 |
| 2011/0083556 A1 | 4/2011 | Duesel, Jr. et al. |
| 2013/0213230 A1 * | 8/2013 | Haari ............... B01D 47/06 |
| | | 431/202 |

FOREIGN PATENT DOCUMENTS

| | | | | |
|---|---|---|---|---|
| CN | 205007836 U | | 2/2016 | |
| CN | 205 308 062 U | * | 6/2016 | |
| CN | 107 158 849 A | * | 9/2017 | ............ B01D 47/06 |
| CN | 107158939 A | | 9/2017 | |
| CN | 107456867 A | | 12/2017 | |
| CN | 109126343 A | | 1/2019 | |
| CN | 209 294 807 U | * | 8/2019 | |
| DE | 4 218 728 A1 | * | 9/1993 | ............ F23J 15/02 |
| EP | 1944543 A2 | | 7/2008 | |
| EP | 3112011 A1 | | 1/2017 | |
| FR | 2 769 973 A1 | * | 4/1999 | ............ F23J 15/02 |
| JP | 6272693 B2 | | 1/2018 | |
| WO | 2015161671 A1 | | 10/2015 | |

OTHER PUBLICATIONS

Avveduto et al., "Analysis of a Wet Scrubber Network in the Air Remediation of Industrial Workplaces: Benefit for the City Air Quality", Italy, 11 pages.

Eman, "Gas Flaring in Industry: An Overview", Petroleum & Coal, Department of Chemical Eng. and Pet. refinery, Suez University, Egypt, 2015, 24 pages.

Zadakbar et al., "Flare Gas Recovery in Oil and Gas Refineries", Oil & Gas Science & Technology, Rev IFP, vol. 63, No. 6, 2008, pp. 705-711.

Espacenet English abstract for JP6272693, published Jan. 31, 2018, 2 pages.

* cited by examiner

INDUSTRIAL AIR CLEANER

FIELD

This disclosure relates to methods and systems for reducing pollution generated by industry. More specifically, this disclosure relates to capturing flare emissions and removing pollutants from gas emissions and ambient air using filters and water.

BACKGROUND

Industrial operations can release air pollutants to atmosphere which can have a negative effect on the environment and the health of the population in the surrounding areas. Industrial operations frequently rely on flares to control emissions of gaseous hydrocarbons and other flammable components from routine operations, and to prevent the release of large quantities of gaseous hydrocarbons during emergency operations. Flares, also referred to as gas flares or flare stacks, are a class of combustion devices used in industrial processing plants to control flammable gases. Flares can be elevated above the ground, or can be located at ground level. They can have an open flame design, or can be enclosed. Often, flares are used to control emissions when flow rates or composition are variable or unknown, such as in emergency or maintenance operations.

Previous technologies used to reduce the emissions impact of flares have been focused on reducing pollution by treating or purifying gas before burning it, or on reducing flare smoke production by using water or steam injection. These technologies can require modifications to the flare stack itself which may not be an option for older facilities or can be costly to implement.

Previous technologies have passed gas streams through water or through a layer of fine water droplets to reduce air pollutants by trapping the pollutants in the liquid. Spraying water to remove dust particles has been used to reduce dust related emissions in industrial activities. Filters are also known in the art to remove certain types of pollutants by physically blocking or trapping pollutants such, and can include particulate filters or demister pads. Other types of pollutant control can include absorption or adsorption. Some types of treatment involve chemical reactions to reduce or remove pollutants. These traditional methods of removing pollutants, however, can only be applied when there is an emissions stream that can be captured.

Although many ways of treating emissions exist, a need still exists to capture the pollutants from an industrial flare stack, especially existing flare stacks. Due to the often unpredictable operation and open flame concept, it can be difficult to capture emissions directly from the stack. Therefore a need still exits to capture, and then properly treat pollutants from industrial flare stacks.

SUMMARY

This disclosure relates to methods and systems for reducing pollution generated by industry. More specifically, this disclosure relates to capturing flare emissions and removing pollutants using filters and water. As explained previously, there are difficulties associated with controlling emissions from flare systems, especially existing flare systems, used in industry. The methods and systems disclosed herein allow for capturing of emissions from industrial air emissions sources, including flares, and treating the emissions using filters and water dispersal.

In embodiments of the present disclosure, an industrial air treatment device captures emissions from a stack, such as an industrial flare. The industrial air treatment device can be in close proximity to the stack, and capturing of the emissions from the stack uses suction and/or predominant wind direction. No direct connection between the industrial air treatment device and the flare. The industrial air treatment device does not fully encompass or enclose the stack, but allows for ambient air flow with the emissions flow. The industrial air treatment device is separate from and not incorporated into the stack. In some embodiments, the industrial air treatment device inlet section is positioned directly above the stack. In some embodiments, the industrial air treatment device inlet section is positioned downwind from the stack. The industrial air treatment device contains fans to draw in the emissions and air flow, and filters to treat the air flow. At least one of the filters can include a water dispersal system that captures and removes pollutants, as well as cleans the filter. The filters can include activated carbon, demister pads, particulate filters, metal oxide filters, and catalytic converters. The industrial air treatment device separates any produced water from the treated air and releases the treated air to the atmosphere.

In an aspect, a system for capturing and treating emissions from industrial emissions sources is provided. The system includes an inlet section, where the inlet section includes a hood opening and is positioned generally downwind of a stack according to prevailing wind direction, so that the inlet section is operable to draw emissions and ambient air into the hood opening as a polluted air flow. The system also includes an air duct, which is operable to route the polluted air flow away from the inlet section, and a duct fan, which is operable to drive the polluted air flow from the inlet section, through the air duct and into a filtration area. The duct fan directs the polluted air flow through the system. The system includes one or more filters. The filter is positioned in the filtration area, and is operable to remove pollutants form the polluted air flow generating a treated air flow. The system also includes a water nozzle operable to provide water to the filter, so that the water captures pollutants and cleans the filter, generating a dirty water. The system also includes a separation vessel operable to collect the dirty water and separate the dirty water from the treated air flow, generating a waste water stream and an outlet air flow, and an outlet stack operable to direct the outlet air flow from the separation vessel, so that the outlet air flow contains reduced pollutants as compared to the emissions and the ambient air together.

In an embodiment, the stack is an industrial flare. The industrial flare includes a flare tip, and the inlet section is in close proximity to the flare tip. The industrial flare includes the flare tip, and the hood opening is positioned above the flare tip. The inlet section and the hood opening contains a stainless steel, the stainless steel operable to withstand temperatures in excess of 1000° C.

In an embodiment, the inlet section further includes an auxiliary opening mechanism operable to convert an auxiliary opening in the inlet section above the flare tip from a closed position to an open position. The auxiliary opening mechanism includes a motor operable to activate the auxiliary opening mechanism, an angle gear operable to rotate when activated by the motor, a rotating shaft connected to the angle gear where the rotating shaft is operable to rotate when activated by the angle gear, an o-ring connected to the rotating shaft, and a gasket sheet attached to the o-ring, so that the gasket sheet covers the auxiliary opening maintaining the closed position until the motor activates the angle gear, the angle gear causing the rotating shaft to rotate, the rotating shaft causing an o-ring rotation, the o-ring rotation causing the gasket sheet to rotate such that the auxiliary opening coverts to the open position.

In an embodiment, the system also includes a plurality of suction fans operable to increase a flow rate of the polluted air flow. The duct fan further includes a twin force duct fan operable to increase the flow rate of the polluted air flow. The filter is selected from a group of air purifying devices including demister pads, particulate filters, metal oxide filters, catalytic converters, and combinations of the same. In such embodiments, the filtration area includes the demister pad, the particulate filter, the metal oxide filter, and the catalytic converter, and the polluted air is treated first by the demister pad, then by the particulate filter, then by the metal oxide filter, and then by the catalytic converter.

In an embodiment, the system further includes an outlet fan operable to increase the outlet air flow. The outlet fan increases the velocity of the outlet air flow, and directs the outlet air flow out of the outlet stack. The outlet fan is a twin induced draft fan.

In a second aspect, a method of reducing pollutants in emissions from an industrial source is provided, where the method includes the step of drawing a pollutant flow into an industrial air treatment device, where the pollutant flow is produced from the stack. The stack has a stack height, and the pollutant flow includes pollutant. The step of drawing the pollutant flow into the industrial air treatment device occurs at the stack height. The method also includes the step of combining the pollutant flow and the ambient air flow to generate a polluted air flow, and filtering in a filtration zone in the industrial air treatment device the polluted air flow with a filter. The filter is operable to remove a portion of the pollutants from the polluted air flow generating a treated air flow. The method also includes the step of expelling the treated air flow into the environment.

In an embodiment, the stack is the industrial flare. In an embodiment, the steps of drawing the pollutant flow and capturing the ambient air flow are performed with a draft fan, where the draft fan is located within the industrial air treatment device. In an embodiment, the filter further includes a water spray, and the water spray is operable to capture pollutant from the polluted air flow and the filter, generating a waste water stream. In an embodiment, the filter is selected from the group of air purifying devices including demister pads, particulate filters, metal oxide filters, catalytic converters, and combinations of the same. In an embodiment, the pollutant include particulate matter, carbon monoxide, hydrogen sulfide, and nitrogen oxides. In an embodiment, the step of drawing the pollutant flow includes the use of the plurality of suction fans.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

In the accompanying Figures, similar components or features, or both, may have a similar reference label. For the purpose of the simplified schematic illustrations and descriptions of FIGS. 1 through 3B, the numerous pumps, valves, temperature and pressure sensors, electronic controllers, and the like that can be employed and well known to those of ordinary skill in the art are not included.

DETAILED DESCRIPTION

While the disclosure will be described with several embodiments, it is understood that one of ordinary skill in the relevant art will appreciate that many examples, variations and alterations to the apparatus and methods described are within the scope and spirit of the disclosure. Accordingly, the embodiments of the disclosure described are set forth without any loss of generality, and without imposing limitations, on the claims.

As used in this disclosure, "air" refers to the collective gases that constitute earth's atmosphere.

As used in this disclosure, the term "in close proximity" refers to objects being near, close to, proximate to, immediately preceding or following, next to, or near touching one another. Objects need not be physically touching to be in close proximity.

The description may use the phrases "in some embodiments," "in an embodiment," or "in embodiments," which can each refer to one or more of the same or different embodiments. Furthermore, the terms "comprising," "including," "containing," and the like, as used with respect to embodiments of the present disclosure, are synonymous.

Advantageously, the embodiments disclosed herein solve many problems. The embodiments disclosed herein reduce the air pollution from industrial activities. In some embodiments, the emissions controlled are coming from the flare. Emissions from flares can be difficult to control due to the volatile and often unpredictable feed to the flare. In some embodiments, the industrial air treatment device is in close proximity to but not above or surrounding the stack, and can therefore be installed during existing operations without affecting the existing stack. Embodiments disclosed herein are physically separate from the stack, and can therefore be implemented without affecting the processes upstream of the stack. Embodiments also allow for air flow to continue to the flare tip and feed the flame, preventing flame problems such as oxygen starvation and smoking.

Figure 1:
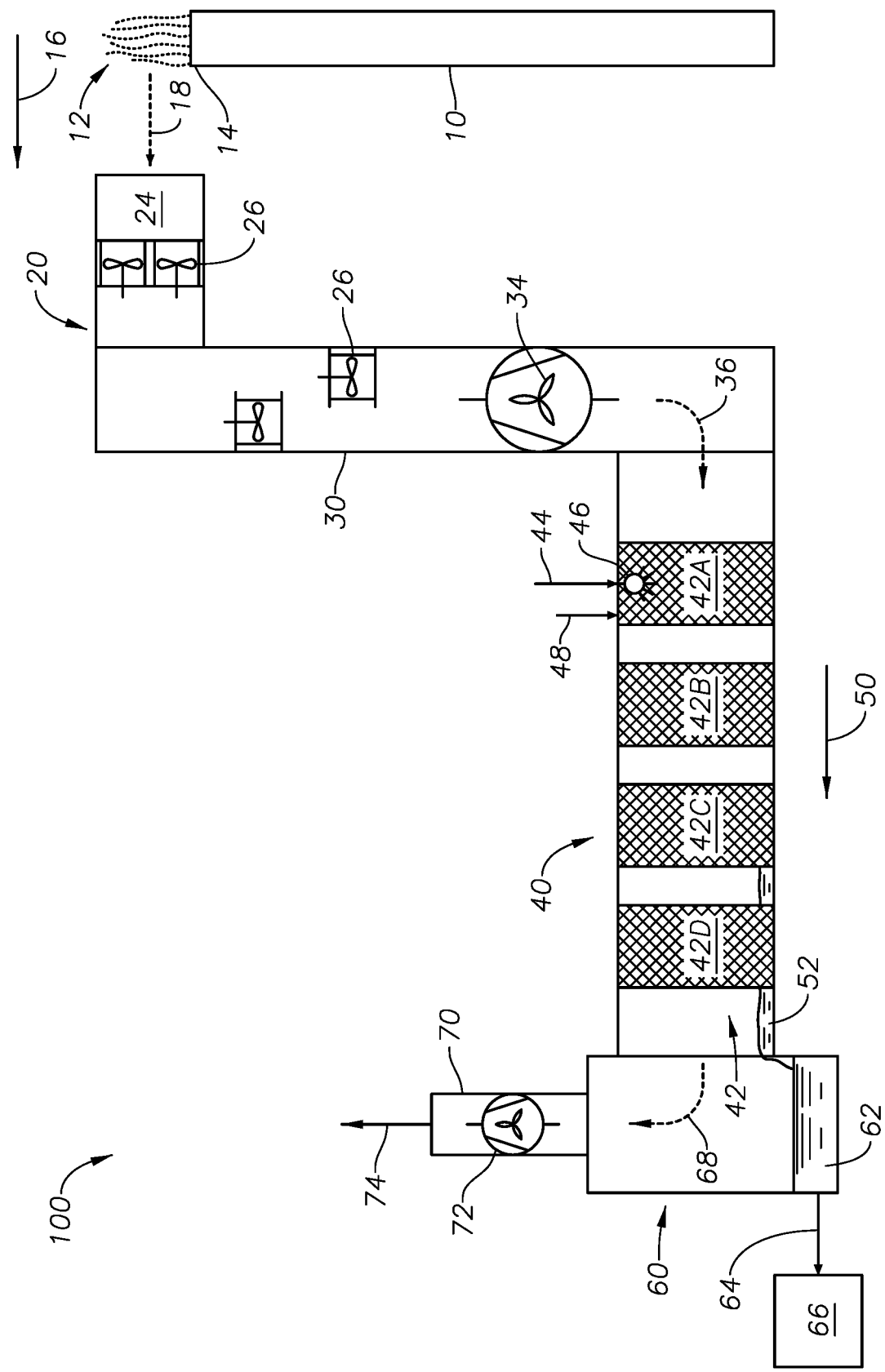
FIG. 1 is a diagram of an industrial air treatment device, according to an embodiment.

Referring now to the figures, FIG. 1 is a diagram of industrial air treatment device 100. Industrial air treatment device 100 is positioned downwind of flare stack 10 in accordance with prevalent wind direction 16. Flare stack 10 has flare tip 14 which produces flame 12. In some embodiments, the stack is not an industrial flare, but is a stack emitting pollutants from industry or commercial enterprises. In some embodiments, the stack does not have an open flame. Flare stack 10 has the stack height, which is the height of the stack where pollutants are emitted. Flare stack 10 is separate from and not connected to industrial air treatment device 100. Flare stack 10 and industrial air treatment device 100 are independently structurally supported. In some embodiments, the stack produced pollutants including CO, $CO_2$, nitrogen oxides including NO and $NO_2$, sulfur compounds including $H_2S$ and $SO_2$, particulate matter, and other pollutants.

Industrial air treatment device 100 includes inlet section 20. Inlet section 20 includes hood opening 24. Inlet section 20 and hood opening 24 are at stack height. Inlet section 20 and hood opening 24 can be made out of any material. In some embodiments, inlet section 20 and hood opening 24 are made out of a stainless steel capable of resisting temperatures up to 1000° C. In some embodiments, the stainless steel is grade 310 stainless steel capable of handling temperatures up to 1150° C. In some embodiments, ceramic coating material is provided within hood opening 24 and inlet section 20 so that the materials can be suitable for the high temperatures associated with being in close proximity to flare tip 14 and flame 12. Hood opening 24 can be sized to capture the emissions and pollutants from the stack. In some embodiments, hood opening 24 is sized to match the diameter of flare tip 14. Sizing of hood opening 24 can be based off of expected air flow, expected size of flame 12, and other factors. Hood opening 24 is positioned in close proximity to flare stack 10.

Ambient air and pollutants from flare stack 10 are suctioned, pulled, pushed, blown, or otherwise moved into hood opening 24 in the direction of inlet air flow 18. The flow of ambient air and pollutants are moved by suction, predominant wind direction, or other methods of transfer. When the wind direction changes from the prevalent wind direction 16 to a different wind direction, the efficiency of the pollutant capture can diminish. Ambient air mixes with the pollutants from flare stack 10 to generate inlet air flow 18. The flow of ambient air around flare tip 14 and into hood opening 24 assists in flare stack 10 operation by preventing oxygen starvation or flame smoking.

Hood opening 24 includes suction fans 26. Suction fans 26 can be any type of fan that directs inlet air flow 18 into inlet section 20. Suction fans 26 can include fans of any size and powered by any means within inlet section 20 and air duct 30. In some embodiments, suction fans 26 are mounted within inlet section 20 and air duct 30 and have individual electrical motors.

Air duct 30 connects inlet section 20 with filtration area 40. Air duct 30 includes duct fan 34. Duct fan 34 can be any type of fan. In some embodiments, duct fan 34 is a twin forced draft fan. In some embodiments, duct fan 34 is the induced draft fan. Duct fan 34 can generate negative air pressure (or suction) to assist in pulling in inlet air flow 18. Duct fan 34 can be sized in direct proportion to the size of hood opening 24 and flare stack 10. Inlet air flow 18 travels through inlet section 20 and through air duct 30 to duct fan 34. Polluted air flow 36 exits duct fan 34, travels through air duct 30, and enters filtration area 40.

Filtration area 40 contains filters 42. Filters 42 can include any type or number of filters designed to remove pollutants from polluted air flow 36. Filters 42 do not have to operate by physical trapping of pollutants but can have modes of action such as absorption, adsorption, or chemical reaction. Filters 42 can be selective to a certain pollutant, or can remove a variety of pollutants. Filters 42 include demister pad 42A, particulate filter 42B, metal oxide filter 42C, and catalytic converter 42D. At least one of filters 42 is provided with a water supply to the filter. Water supply line 44 provides clean water to water spray nozzle 46, which sprays or otherwise distributes water over demister pad 42A. The water spray assists in capturing pollutants in the water, and also cleans the filter on which it is installed, removing collected pollutants from the filter to improve filter efficiency and lifespan. In some embodiments, multiple filters 42 are provided with water spray nozzles 46 to distribute water over the filter. The distributed water can clean filters 42 and can remove captured pollutants from filters 42 so that the pollutants are carried with the water away from filters 42. Some pollutants captured in the water can biodegrade in the water over time, or can be removed or treated in the water stream. Pressurized clean air is also provided to filters 42 through clean air supply line 48. Clean air can assist in cleaning filters 42 or pushing captured pollutants through filters 42 to maximize efficiency.

Filters 42 are arranged in the following order: demister pad 42A, particulate filter 42B, metal oxide filter 42C, and catalytic converter 42D. Demister pad 42A removes particulate matter, entrained solids, entrained liquid droplets, and ashes. The water provided over demister pad 42A through water spray nozzle 46 captures additional pollutants, which are removed in used water 52. Particulate filter 42B also removes particulate matter. Particulate filter 42B can be an activated carbon filter. Metal oxide filter 42C removes $H_2S$. Metal oxide filter 42C can be a zinc oxide filter. Catalytic converter 42D removes nitrogen oxides and CO. Catalytic converter 42D can be a platinum catalytic converter. In a preferred embodiment, filter 42 are arranged in the order as shown in FIG. 1. It is preferred, though not necessary, to place metal oxide filter 42C before catalytic converter 42D as untreated $H_2S$ in the air stream introduced to catalytic converter 42D can generate blockages and affect efficacy. In some embodiments, filters 42 are arranged in varying orders, or do not include varying type of the filters described above. Polluted air flow 36 is treated in filters 42 in filtration area 40 to generate treated air flow 68.

Used water 52 is generated by the water spray and distribution in filtration area 40 and flows in the direction of water flow 50 towards separation vessel 60. Separation vessel 60 can be any type of vessel designed to allow water or water spray to separate from treated air flow 68. In some embodiments, the separation vessel 60 is a separation drum. Collected water 62 gathers at the bottom of separation vessel 60. Waste water stream 64 is removed from separation vessel 60 and sent to water treatment 66. Water treatment 66 can be any type of water treatment system that treats industrial wastewater.

Treated air flow 68 is directed out of outlet stack 70 through outlet fan 72 as outlet air flow 74 and into the surrounding environment. Outlet fan 72 can be any type of fan capable of providing negative air pressure or suction to treated air flow 68, and providing positive force to outlet air flow 74 to move outlet air flow 74 into the surrounding environment. Outlet fan 72 can be sized in direct proportion to the size of outlet stack 70. In some embodiments, outlet fan 72 is a forced draft fan. In some embodiments, outlet fan 72 is a twin induced draft fan. In some embodiments, outlet fan 72 is not present in the design.

Figure 2:
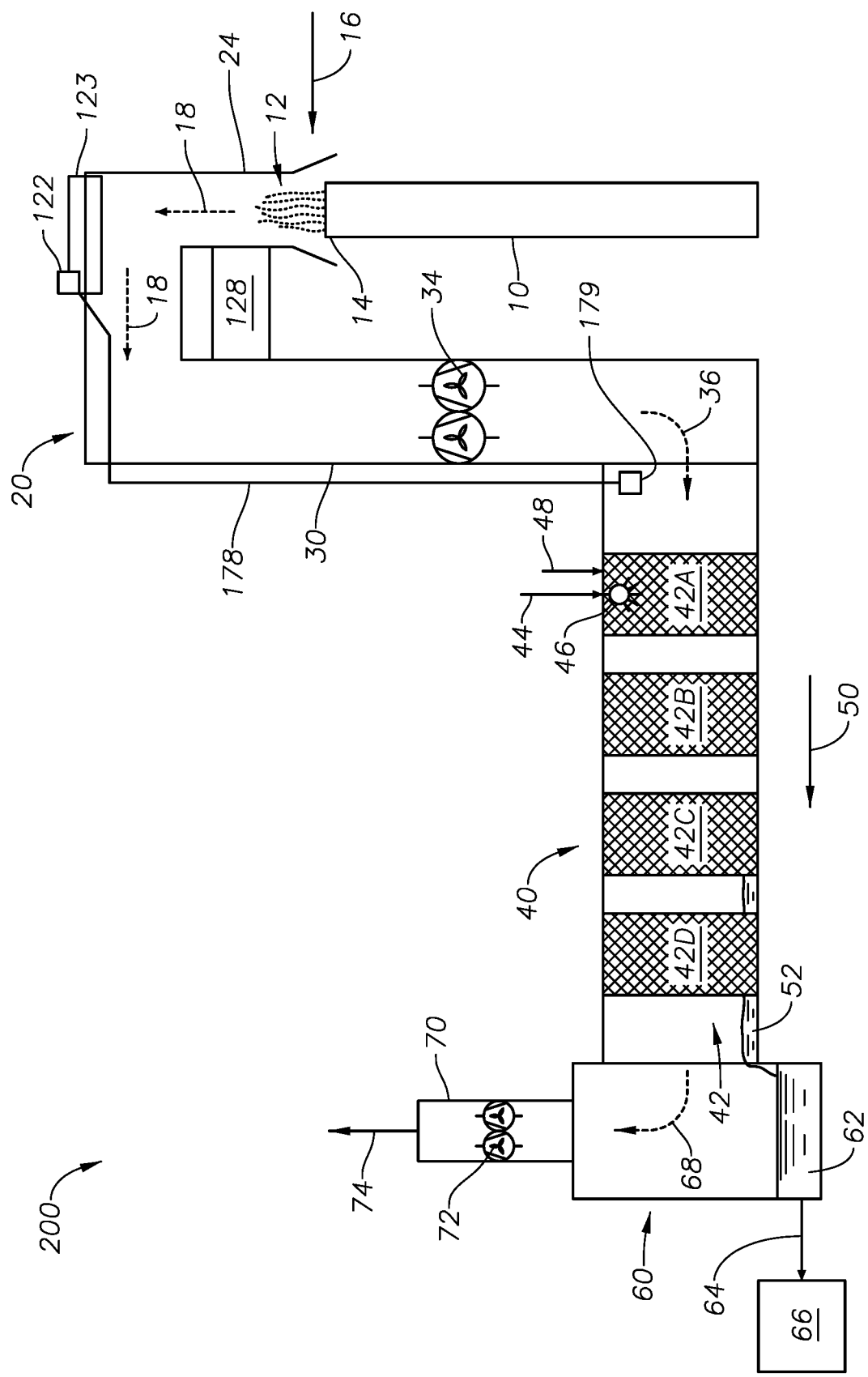
FIG. 2 is a diagram of an industrial air treatment device with an overhead hood, in accordance with another embodiment.

Referring to FIG. 2, industrial air treatment device with overhead hood 200 is pictured with flare stack 10. Flare stack 10 can have the same characteristics as above. Industrial air treatment device with overhead hood 200 includes hood opening 24 and inlet section 20. Hood opening 24 is in close proximity to and positioned directly above flare tip 14. Hood opening 24 partially or fully covers flare tip 14 or flame 12 when viewed from the top. Hood opening 24 is not attached to flare tip 14 or flare stack 10. Ambient air can still interact with flare tip 14 and enter hood opening 24. In some embodiments, hood opening 24 is sized to match the diameter of flare tip 14. Support beam 128 connects the outside of hood opening 24 and air duct 30 to provide additional structural support to hood opening 24 and inlet section 20.

Inlet section 20 includes auxiliary opening mechanism 122 and auxiliary opening 123. Auxiliary opening mechanism 122 operates to remove a cover from auxiliary opening 123 and convert auxiliary opening 123 from the closed position to the open position. During normal operations, auxiliary opening 123 is in the closed position. Due to the nature of the industrial streams that industrial flare stacks often control, for safety and operational control, it can become necessary to activate auxiliary opening mechanism 122 and convert auxiliary opening 123 from the closed position to the open position to release emissions during upset conditions, provide additional air flow, or to control or observe emissions from flare stack 10. Any mechanism capable of uncovering or otherwise opening auxiliary opening 123 can be used for auxiliary opening mechanism 122. In some embodiments, motors are used to open a cover on auxiliary opening 123. In some embodiments, pressure relief safety devices are used to cover auxiliary opening 123. In some embodiments, rupture gaskets are used for auxiliary opening mechanism 122, and are designed to break or open during extreme conditions. In some embodiments, auxiliary opening mechanism 122 is operated electronically. Auxiliary opening mechanism 122 can be operated manually. Manual connection 178 can be a chain or shaft that connects to auxiliary opening mechanism 122, allowing manual control 179 to operate auxiliary opening mechanism 122. Manual control 179 can be a lever, gear, or crank mechanism. Manual connection 178 can reduce weight on inlet section 20 as compared to other remote or electronic mechanisms used for auxiliary opening mechanism 122.

Ambient air and pollutants from flare stack 10 are suctioned, pulled, pushed, blown, or otherwise moved into hood opening 24 in the direction of inlet air flow 18. Inlet air flow 18 travels through inlet section 20 and through air duct 30 to duct fan 34.

Air duct 30, filtration area 40, and the other components of industrial air treatment device with overhead hood 200 can have the same characteristics as industrial air treatment device 100. Inlet air flow 18 travels through industrial air treatment device with overhead hood 200 as in industrial air treatment device 100, resulting in similar treatment.

Figure 3A:
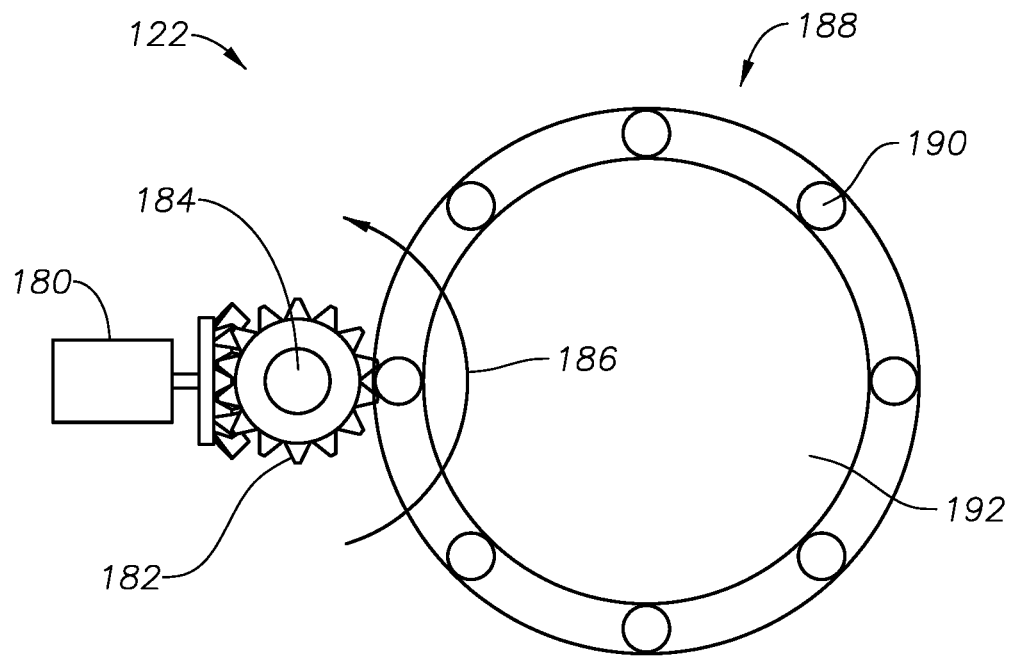
FIG. 3A is a diagram of a top view of an auxiliary opening mechanism, in accordance with another embodiment.

Referring to FIG. 3A, a top view of auxiliary opening mechanism 122 is provided. Auxiliary opening mechanism 122 includes motor 180, angle gear 182, rotating shaft 184, O-ring 188, bolts 190, and gasket sheet 192. Motor 180 is connected to angle gear 182. Angle gear 182 is connected to rotating shaft 184. Rotating shaft 184 is connected to O-ring 188. O-ring 188 holds gasket sheet 192. Gasket sheet 192 is secured into O-ring 188 by bolts 190.

When activated, motor 180 initiates rotation of angle gear 182. Angle gear 182 causes rotation 186 of rotating shaft 184. Rotation 186 of rotating shaft 184 results in O-ring 188 and gasket sheet 192 rotation, which uncovers the auxiliary opening.

Motor 180 can be any type of motor that can cause the rotation of angle gear 182. Motor 180 can be remotely activated. Angle gear 182 can be any type of gear that transfers the motion from motor 180 to rotating shaft 184. O-ring 188 can be any type of device that can hold a cover for the auxiliary opening in place. Gasket sheet 192 can be any type of sheet that allows for covering of the auxiliary opening. In an embodiment, gasket sheet 192 is a TEFLON™ sheet that can withstand high temperatures. Motor 180 can be manually or electronically bypassed for manual operation of angle gear 182 through manual connection 178 (not shown).

Figure 3B:
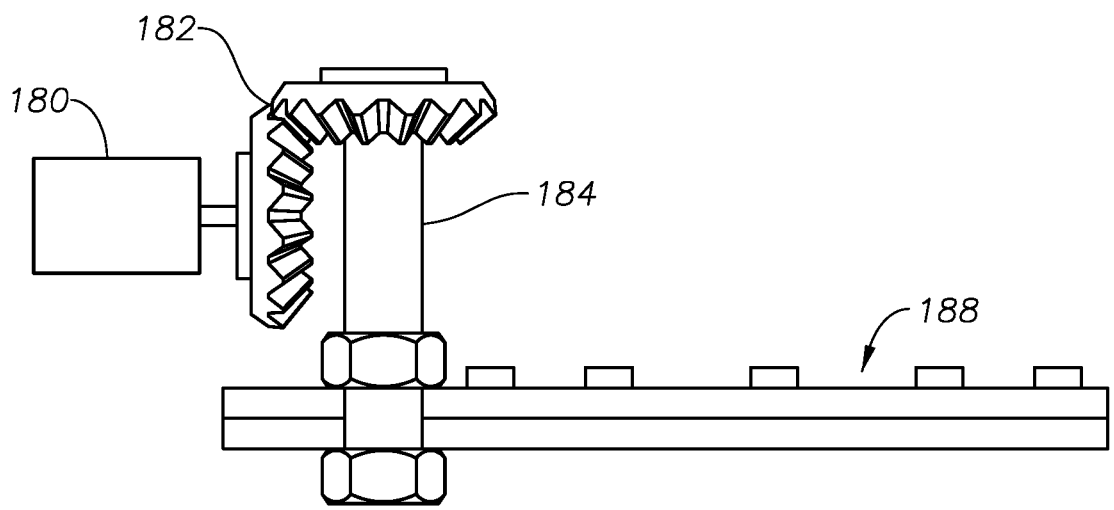
FIG. 3B is a diagram of a side view of an auxiliary opening mechanism, in accordance with another embodiment.

Referring to FIG. 3B, a side view of auxiliary opening mechanism 122 is provided. Motor 180 is connected to angle gear 182. Angle gear 182 is connected to rotating shaft 184. Rotating shaft 184 is connected to O-ring 188. O-ring 188 holds gasket sheet 192 (not pictured).

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

What is claimed is:

1. A system for capturing and treating emissions from industrial emissions sources, the system comprising:
    an inlet section, the inlet section comprising a hood opening, the inlet section positioned generally downwind of a stack according to a prevailing wind direction, such that the inlet section is operable to draw emissions and ambient air into the hood opening as a polluted air flow;
    an air duct operable to route the polluted air flow away from the inlet section;
    a duct fan operable to drive the polluted air flow from the inlet section, through the air duct and into a filtration area;
    a filter, the filter positioned in the filtration area, the filter operable to remove pollutants from the polluted air flow generating a treated air flow;
    a water nozzle operable to provide water to the filter, such that the water captures pollutants and cleans the filter, generating a dirty water;
    a separation vessel operable to collect the dirty water and separate the dirty water from the treated air flow, generating a waste water stream and an outlet air flow; and
    an outlet stack operable to direct the outlet air flow from the separation vessel, such that the outlet air flow comprises reduced pollutants as compared to the emissions and the ambient air together.

2. The system of claim 1, wherein the stack is an industrial flare.

3. The system of claim 2, wherein the industrial flare comprises a flare tip, and wherein the inlet section is in close proximity to the flare tip.

4. The system of claim 2, wherein the industrial flare comprises a flare tip, and wherein the hood opening is positioned above the flare tip.

5. The system of claim 4, wherein the inlet section and the hood opening comprises a stainless steel, the stainless steel operable to withstand temperatures in excess of 1000° C.

6. The system of claim 4, wherein the inlet section further comprises an auxiliary opening mechanism operable to convert an auxiliary opening in the inlet section above the flare tip from a closed position to an open position.

7. The system of claim 6, wherein the auxiliary opening mechanism comprises:
    a motor operable to activate the auxiliary opening mechanism;
    an angle gear operable to rotate when activated by the motor;

a rotating shaft connected to the angle gear, the rotating shaft operable to rotate when activated by the angle gear;

an o-ring connected to the rotating shaft; and a gasket sheet attached to the o-ring, such that the gasket sheet covers the auxiliary opening maintaining the closed position until the motor activates the angle gear, the angle gear causing the rotating shaft to rotate, the rotating shaft causing an o-ring rotation, the o-ring rotation causing the gasket sheet to rotate such that the auxiliary opening converts to the open position.

8. The system of claim 1, further comprising a plurality of suction fans operable to increase a flow rate of the polluted air flow.

9. The system of claim 1, wherein the duct fan is a twin forced draft fan operable to increase a flow rate of the polluted air flow.

10. The system of claim 1, wherein the filter is selected from a group of air purifying devices consisting of: demister pads, particulate filters, metal oxide filters, catalytic converters, and combinations of the same.

11. The system of claim 1, wherein the filtration area comprises a demister pad, a particulate filter, a metal oxide filter, and a catalytic converter, and wherein the polluted air flow is treated first by the demister pad, then by the particulate filter, then by the metal oxide filter, and then by the catalytic converter.

12. The system of claim 1, comprising an outlet fan operable to increase the outlet air flow.

13. The system of claim 12, wherein the outlet fan is a twin induced draft fan.

14. A method of reducing pollutants in emissions from an industrial source, the method comprising the steps of:

drawing a pollutant flow into an industrial air treatment device, the pollutant flow produced from a stack, the stack having a stack height and the pollutant flow comprising pollutants, wherein the step of drawing occurs at the stack height;

capturing an ambient air flow from an environment in the industrial air treatment device, wherein the ambient air flow comprises air, wherein the step of capturing occurs at the stack height;

combining the pollutant flow and the ambient air flow to generate a polluted air flow;

filtering in a filtration zone in the industrial air treatment device the polluted air flow with a filter, the filter operable to remove a portion of the pollutants from the polluted air flow generating a treated air flow; and expelling the treated air flow into the environment.

15. The method of claim 14, wherein the stack is an industrial flare.

16. The method of claim 14, wherein the steps of drawing the pollutant flow and capturing the ambient air flow are performed with a draft fan, the draft fan located within the industrial air treatment device.

17. The method of claim 14, wherein the filter further comprises a water spray, the water spray operable to capture pollutants from the polluted air flow and the filter, generating a waste water stream.

18. The method of claim 17, further comprising the step of separating the treated air flow from the waste water stream.

19. The method of claim 14, wherein the filter is selected from a group of air purifying devices consisting of: demister pads, particulate filters, metal oxide filters, catalytic converters, and combinations of the same.

20. The method of claim 14, wherein the pollutants comprise particulate matter, carbon monoxide, hydrogen sulfide, and nitrogen oxides.

21. The method of claim 14, wherein the step of drawing a pollutant flow comprises the use of a plurality of suction fans.

* * * * *